United States Patent
Yeddu et al.

(10) Patent No.: US 11,694,025 B2
(45) Date of Patent: Jul. 4, 2023

(54) COGNITIVE ISSUE DESCRIPTION AND MULTI-LEVEL CATEGORY RECOMMENDATION

(71) Applicant: KYNDRYL, INC., New York, NY (US)

(72) Inventors: Dinesh Babu Yeddu, Guntur (IN); Haree Krushnan, Bangalore (IN); Pooja Chandrashekar Hegde, Sirsi (IN); Vinita Tale, Bangalore (IN)

(73) Assignee: Kyndryl Inc., New York, NY (US)

( * ) Notice: Subject to any disclaimer, the term of this patent is extended or adjusted under 35 U.S.C. 154(b) by 398 days.

(21) Appl. No.: 16/865,785

(22) Filed: May 4, 2020

(65) Prior Publication Data
US 2021/0342532 A1    Nov. 4, 2021

(51) Int. Cl.
  G06F 40/205 (2020.01)
  G06F 9/38 (2018.01)
  G06N 20/00 (2019.01)
  G06F 18/214 (2023.01)

(52) U.S. Cl.
  CPC .......... *G06F 40/205* (2020.01); *G06F 9/3836* (2013.01); *G06F 18/2155* (2023.01); *G06N 20/00* (2019.01)

(58) Field of Classification Search
  CPC ................ G06F 40/205; G06F 9/3836; G06K 9/6259; G06K 9/6215; G06N 20/00; G06V 30/40
  USPC .......................................................... 704/9
  See application file for complete search history.

(56) References Cited

U.S. PATENT DOCUMENTS

| | | | |
|---|---|---|---|
| 8,489,941 B2 | 7/2013 | Anand et al. | |
| 9,306,962 B1 | 4/2016 | Pinto | |
| 9,317,829 B2 | 4/2016 | Anand et al. | |
| 2007/0192085 A1* | 8/2007 | Roulland | G06F 16/3329 704/9 |
| 2010/0174691 A1* | 7/2010 | Caldwell | G06F 16/285 707/696 |
| 2013/0110518 A1* | 5/2013 | Gruber | G06F 3/167 704/275 |

(Continued)

FOREIGN PATENT DOCUMENTS

EP    3193265 A1    7/2017

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Stephen S Hong
*Assistant Examiner* — Broderick C Anderson
(74) *Attorney, Agent, or Firm* — Erik Swanson; Matthew M. Hulihan; Heslin Rothenberg Farley & Mesiti PC

(57) ABSTRACT

A processor may receive first issue data. The first issue data may be associated with input data entered by a user into a user interface on the issue submission application. The processor may analyze the first issue data. The processor may select a first set of prompted issue descriptions. The first set of prompted issue descriptions may be selected based on analyzing the first issue data. The processor may prompt the user to select a subset of the first set of prompted issue descriptions. The processor may receive from the user a selected subset of the first set of prompted issue descriptions. The processor may output an identified issue description. The identified issue description may be generated based on the selected subset of the first set of prompted issue descriptions.

20 Claims, 6 Drawing Sheets

(56) References Cited

U.S. PATENT DOCUMENTS

| | | | | |
|---|---|---|---|---|
| 2013/0326407 | A1* | 12/2013 | van Os | G06T 19/00 |
| | | | | 715/810 |
| 2015/0346963 | A1* | 12/2015 | Spear | G06F 11/0772 |
| | | | | 715/733 |
| 2016/0140217 | A1* | 5/2016 | Sano | G06N 20/10 |
| | | | | 706/55 |
| 2019/0065499 | A1* | 2/2019 | Wagstaff | G06F 16/3349 |
| 2019/0132191 | A1 | 5/2019 | Mann et al. | |
| 2019/0349321 | A1* | 11/2019 | Cai | G06F 40/237 |
| 2020/0089561 | A1* | 3/2020 | Laing | G06F 11/0727 |
| 2020/0242623 | A1* | 7/2020 | Savir | G06K 9/6215 |
| 2020/0327284 | A1* | 10/2020 | Sapugay | G06N 3/006 |
| 2020/0349529 | A1* | 11/2020 | Wang | G06F 40/284 |
| 2021/0328888 | A1* | 10/2021 | Rath | G06Q 30/016 |

OTHER PUBLICATIONS

Freshservice, "Automatically Categorize Tickets with Field Suggester", Solution Home Incident Management, Ticket Actions, Modified on Aug. 11, 2019, 3 pages.

Agambagis, "Handling tickets dynamically with Smart Recorder", Documentation for Remedy with Smart IT 2.0—BMC Documentation, Last modified, Sep. 27, 2019, 5 pages.

SysAid, "IT Ticketing System Software & Solutions", Easy Ticket Management, printed on Jan. 28, 2020, 6 pages.

Disclosed Anonymously, "Method and System for Dynamically Providing Contextual Content to User for Producing a Write-up", An IP.com Prior Art Database Technical Disclosure, IP.com No. IPCOM000197523D, IP.com Electronic Publication Date: Jul. 13, 2010, 5 pages.

* cited by examiner

COGNITIVE ISSUE DESCRIPTION AND MULTI-LEVEL CATEGORY RECOMMENDATION

BACKGROUND

The present disclosure relates generally to the field of cognitive computing, and more specifically to cognitively recommending issue descriptions to users.

Many electronic applications relay user inputted data to secondary applications or systems. The user inputted data may need to be labeled, summarized, or described to efficiently direct the data to secondary applications or systems. In the information technology services industry, extracting appropriate descriptions and/or labels from incident descriptions provided by a user is a critical and challenging task. Proper labelling of incident tickets helps accurately identify repeating issues and outages as well as problem areas (e.g., applications/domain/hardware) which may not obvious to administrators using existing tools. Proper labelling of incident tickets helps administrators allocate and assign incident tickets to appropriate owner groups and resolver groups.

SUMMARY

Embodiments of the present disclosure include a method, computer program product, and system for generating issue descriptions from data entered into an issue submission application. A processor may receive first issue data. The first issue data may be associated with input data entered by a user into a user interface on the issue submission application. The processor may analyze the first issue data. The processor may select a first set of prompted issue descriptions. The first set of prompted issue descriptions may be selected based on analyzing the first issue data. The processor may prompt the user to select a subset of the first set of prompted issue descriptions. The processor may receive from the user a selected subset of the first set of prompted issue descriptions. The processor may output an identified issue description. The identified issue description may be generated based on the selected subset of the first set of prompted issue descriptions.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
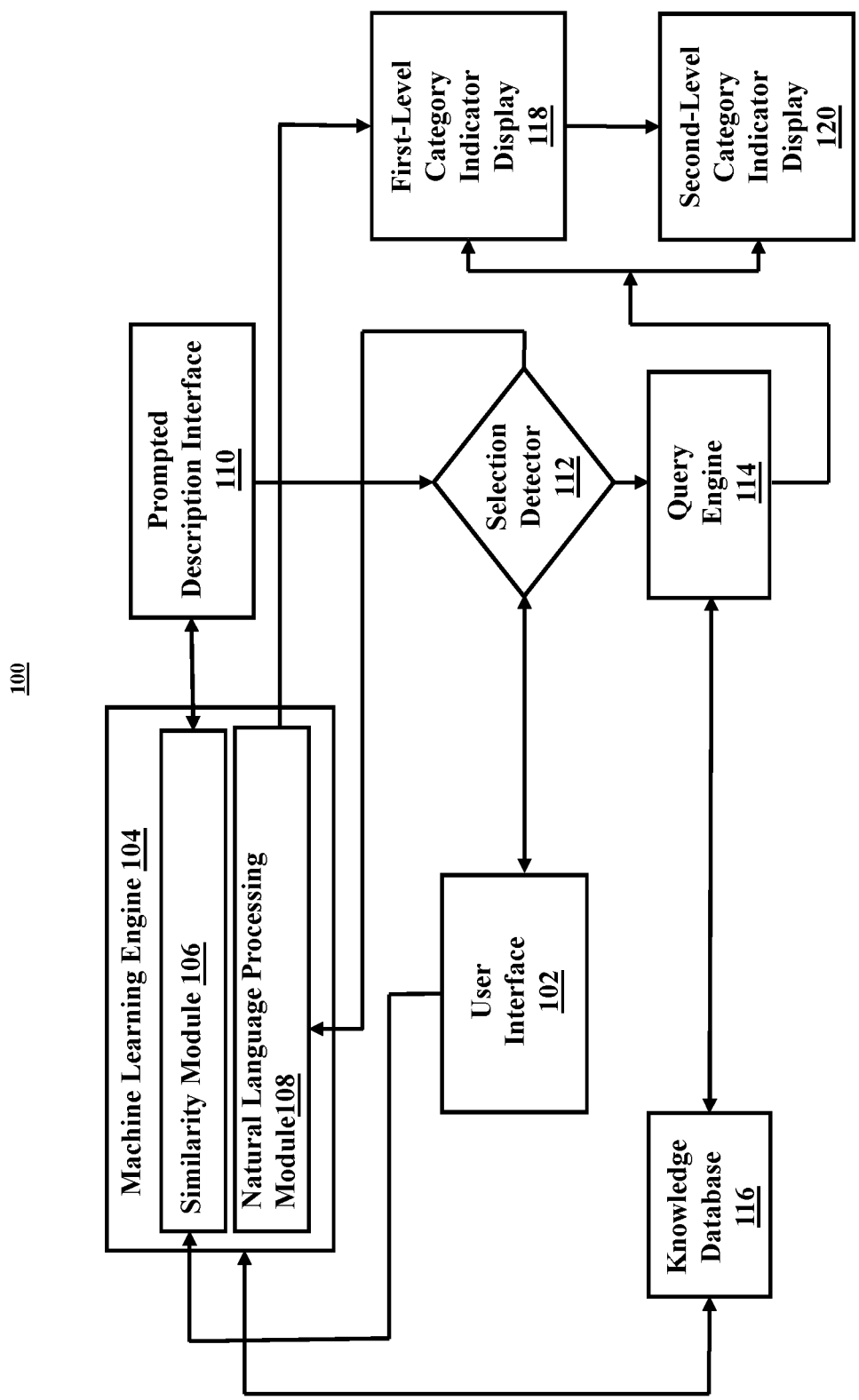
FIG. 1 is a block diagram of an exemplary system for issue description generation from data entered into an issue submission application, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of cognitive computing, and more specifically to cognitively recommending issue descriptions to users. While the present disclosure is not necessarily limited to such applications, various aspects of the disclosure may be appreciated through a discussion of various examples using this context.

Many electronic applications relay user inputted data to secondary applications or systems. The user inputted data may need to be labeled, summarized, or described to efficiently direct the data to secondary applications or systems. In the information technology services industry, extracting appropriate descriptions and/or labels from incident descriptions provided by a user is a critical and challenging task. Proper labelling of incident tickets helps accurately identify repeating issues and outages as well as problem areas (e.g., applications, domain, hardware, etc.) which may not obvious to administrators using existing tools. Currently, administrators spend a large amount of time and resources to understand the incident description entered by non-technical end users. End users frequently describe the same issue in different ways. Further, end users' usage of free text in incident descriptions makes it even more difficult to identify, or extract, proper labels for a ticket based on the incident description.

Accordingly, the present disclosure is directed to a method, system, and computer program product by which issue descriptions are cognitively and concisely generated from data entered into an issue submission application, and issue labels are assigned while a user is entering data into an issue submission application. It is noted that existing approaches to issue description generation find appropriate issue labels after tickets are generated from the ticketing tool. Existing approaches may use supervised or dictionary-based approaches to generating issue descriptions. However, there is a possibility of assigning incorrect labels to tickets as issue data entered by users may have a lot of noise (e.g., missing punctuation, misspellings, text which is not a keyword or phrase, etc.) apart from issue tokens (e.g., phrases, keywords, etc.). Unsupervised approaches (e.g., extractive or abstractive) may summarize text but may not be a good fit for issue label generation of information technology (IT) tickets. These unsupervised approaches use rules which include high probability distribution of tokens, top frequency words, or phrases, and word combinations, but issues with noisy data may lead to bad label generation. As such, there is continued need for an improved method for issue description generation from data entered into an issue submission application, as which is described herein.

In some embodiments, a processor may receive first issue data. In some embodiments, the first issue data may be associated with input data entered by a user into a user interface on an issue submission application. The first issue data may be analyzed using the processor. In some embodiments, a first set of prompted issue descriptions may be selected by the processor. In some embodiments, the set of prompted issue descriptions is selected based on the analysis of the first issue data. In some embodiments, the user may be prompted to select a subset of the first set of prompted issue descriptions. In some embodiments, the processor may receive a selected subset of the first set of prompted issue descriptions from the user. In some embodiments, the processor may output an identified issue description. In some embodiments, the identified issue description may be generated based on the selected subset of the first set of prompted issue descriptions.

For example, a user experiencing IT issues with a computer system in a workplace may use an IT issue-ticketing software to submit a help request ticket to an IT help center. The user may enter text describing the IT issue into a description window of the IT issue-ticketing software (e.g., the user may enter the description "I can't log in to my account" into a user interface of the IT-issue-ticketing software). As another example, the user may copy an image/snapshot (e.g., an error message), containing some description into the user interface of the IT-issue ticketing software.

In some embodiments, text or image data entered into the user interface may be extracted, and first issue data, which is associated with the entered text or image data, may be received by a processor. For example, text may be extracted from a copied image of a computer error message and sent to the processor. The processor may analyze the first issue data. Based on this analysis, the processor may select a set of prompted issue descriptions. The prompted issue descriptions may be summaries of the information input by the user.

For example, the first set of prompted issue descriptions may include "Email account password reset issue," "Web-based email account password reset issue," "Presentation software password reset issue," and "Other Issue." The user may be prompted to select a subset of the first set of prompted issue descriptions, and the processor may receive the selected subset of the first set of prompted issue descriptions. For example, the user may select "Email account password reset issue."

In some embodiments, the processor may then output an identified issue description. The identified issue description may be submitted to an IT help center where the identified issue description may be used to prioritize the ticket, sort the ticket into different categories of tickets, and/or direct the ticket to specific personnel in the help center via a generated alert. In some embodiments, the identified issue description may be the same as the selected subset of the set of prompted issue descriptions, and in some embodiments, they may differ. For example, the selected subset of the first set of prompted issue descriptions "Email account password reset issue" may be the same as the identified issue description which is output. For example, the identified issue description "Email account password reset issue" may be submitted to an IT help center where the ticket will be directed to personnel who work with email accounts.

In some embodiments, analyzing the first issue data may comprise accessing a similarity model. In some embodiments, the similarity model may provide the first set of prompted issue descriptions based on a similarity comparison of the first issue data and the first set of prompted issue descriptions. For example, the first issue data may be analyzed using machine learning techniques with a model trained using historic issue data (e.g., cognitive computing). The similarity model may output a set of prompted issue descriptions based on how similar the first issue data is to issue descriptions which the similarity model learned using historic issue data.

In some embodiments, the processor may utilize a machine learning engine that may be trained to analyze issue data utilizing the selected subset of the first set of prompted issue descriptions. In some embodiments, the machine learning engine may be trained by tagging the first issue data with a first issue descriptor tag. For example, the first issue data "I tried logging in to my email, but got a wrong password message. Then I tried to enter a different password but couldn't. I tried logging in about ten times, and now they are asking for my phone number to verify identity." may be tagged with the first issue descriptor tag "email password." The first issue descriptor tag may label the first issue data with a category which labels the type of issue described by the first issue data.

In some embodiments, the processor may tag the selected subset of the first set of prompted issue descriptions with a confidence tag. In some embodiments, the confidence tag may indicate that there is high confidence that the selected subset of the first set of prompted issue descriptions relates to the first issue data. For example, the first set of prompted issue descriptions may include: "Email Application password reset issue" and "Email Application two-factor authentication." If the user selects "Email Application password reset issue" as the selected subset of the first set of prompted issue descriptions, that selected issue description may be tagged with a confidence tag to indicate that the selected issue description was chosen by the user. The confidence tag may indicate that there is more confidence that the selected issue description relates to the first issue data than the non-selected issue description(s). In some embodiments, the first issue data, the first issue descriptor tag, the selected subset of the first set of prompted issue descriptions, and the confidence tag may be stored in a repository. In some embodiments, the first issue descriptor tag and the confidence tag may be combined into a singular tag and/or set of metadata.

In some embodiments, the processor may receive a second issue data and analyzing the second issue data using the machine learning engine. In some embodiments, the second issue data may be tagged with a second issue descriptor tag, where second issue descriptor tag is similar to the first issue descriptor tag. The method may further include selecting a second set of prompted issue descriptions based on the confidence tag. For example, a second user may enter the following description into an issue submission application "I tried logging into my email ten times but can't with my new password." The second issue descriptor tag may be identical to the first issue tag "email password." Because of the similarity of the first issue descriptor tag and the second issue descriptor tag, the second set of prompted issue description may include "Email application password reset issue," which is an issue description associated with the issue tag "email password" and which was tagged with a confidence tag.

In some embodiments, the processor may label the identified issue description which is output by the processor with a first-level category indicator associated with an application name. In some embodiments, the processor may further label the identified issue description with a second-level category indicator associated with an issue type. For example, the identified issue description "email password reset issue" may be labeled with a first-level category indicator which identifies the application name, e.g., email. The identified issue description may also be labeled with a second-level category indicator, "password reset issue," which identifies the issue type, e.g., a password reset issue. These labels may be obtained from a database which stores first-level and second-level category indicators for each prompted issue description.

In some embodiments, the first set of prompted issue descriptions may include an alternative option, and the selected subset of the first set of prompted issue descriptions received from the user may be the alternative option. For example, the alternative option may be a prompted issue description of the first set of prompted issue descriptions which is selected to indicate that the other prompted issue descriptions in the first set of prompted issue descriptions are not appropriate for selection or do not adequately describe the IT ticketing issue. For example, the user may enter the description "I can't access my account" into the IT-issue-ticketing software, and the set of prompted issue descriptions may include "Email password reset issue," "Web-based email password reset issue," "Teleconference software password reset issue," and "Other Issue." If the user is not experiencing a password reset issue, the user may select the alternative option "Other Issue."

In some embodiments, the processor may further prompt the user to input an issue description. In some embodiments, the inputted issue description may be analyzed utilizing a natural language processing model. For example, after selecting "Other Issue," the user may input "Email application wasn't installed properly on my new computer." This inputted issue description, "Email application wasn't installed properly on my new computer," may be analyzed using natural language processing techniques to identify email as the application with which the user is having an IT issue, and that the IT issue is an installation issue. The identified issue description "Email installation issue" may then be outputted to the IT help desk. The natural language processing techniques may include part of speech analysis and may be performed by a natural language processing module described below in regard to FIG. 2.

In some embodiments, the processor may further parse the inputted issue description into individual datum. In some embodiments, the individual datum may be tagged with respective indicators which designate each individual datum to a category. In some embodiments, a first subset of the individual datum may be labeled with a first-level category indicator associated with an application name based on the respective indicators. In some embodiments, a second subset of the individual datum may be labeled with a second-level category indicator associated with an issue type based on the respective indicators.

For example, the inputted issue description "I am not able to enter Remote Desktop" may be parsed into individual datum: "I," "am," "not," "able," "to," "enter," "Remote," "Desktop." For each datum an indicator is assigned. For example, "I" may receive the indicator "pronoun," "am" may receive the indicator "linking verb," "not" may receive the indicator "adverb," "able" may receive the indicator "verb," "to" may receive the indicator "helping verb," "enter" may receive the indicator verb, and "Remote Desktop" may receive the indicator "proper noun." Based on parsing the issue data text into individual datum and tagging the individual datum with respective indicators (in this case breaking a sentence down into individual words and assigning the parts of speech to the individual words) labels may be assigned to subsets of the datum.

For example, a first subset of the datum (e.g., "Remote Desktop") may be labeled with a first-level category indicator (e.g., "Remote Desktop") associated with an application name (e.g., Remote Desktop). A second subset of datum (e.g., "not," "able," "to," "enter") may be labeled with a second-level category indicator (e.g., "not able to enter") associated an issue type (e.g., the failure to enter a particular application).

In some embodiments, the first-level and second-level category indicators may be assigned to a subset of the individual datum based on the indicators assigned to the datum. For example, rules, based on the indicators with which the individual datum are tagged, may be in place which help to identify which of the individual datum describe the application with which the user is having an issue. Other rules may help to identify which of the individual datum describe the type of issue that the user is having with the application. For example, one rule may be that proper nouns preceded by verbs make up the subset of the individual datum which should be labeled with a first-level category indicator associated with an application name. As another example, a second rule may be that adverbs, verbs, and helping verbs make up the subset of individual datum which should be labeled with a second-level category indicator associated with an issue type.

Referring now to FIG. 1, which illustrates a block diagram of a system 100 for issue description generation from data entered into a submission application. System 100 includes a user interface 102 of an issue submission application which is in communication with a machine learning engine 104. The machine learning engine 104 includes a similarity module 106 and a natural language processing module 108. User inputted data is entered in the form of text, or an image, into the user interface. The user input data may be processed, for example, if the input data is an image from which text is extracted, to provide first issue data to the processor. The first issue data is received by the machine learning engine 104. The machine learning engine 104 utilizes the similarity module 106 to analyze the first issue data. The similarity module 106 utilizes machine learning techniques to develop a model by which the first issue data is compared to historic issue data. The similarity module 106 provides a set of issue descriptions which are based on the similarity of the first issue data and the individual prompted issue descriptions. The first set of prompted issue descriptions is provided to the user on a prompted description interface 110. On the prompted description interface 110, the user is prompted to select a subset of the set of first issue descriptions. A selection detector 112 receives, from the user utilizing the prompted description interface 110, the selected subset of the first set of prompted issue descriptions.

If the user selects one of the prompted issue descriptions which contain an identified issue description, the selected subset of the first set of prompted issue descriptions is sent to a query engine 114 which retrieves, utilizing knowledge database 116, a first-level category indicator associated with an application name and a second-level category indicator associated with an issue type. The knowledge database 116 may include all possible pre-defined issues, application names, and descriptions and may be sourced from data lakes such as CDI software specific error code manuals, or other sources of information.

The first-level category indicator is output along with the identified issue description and displayed in a first-level category indicator display 118. Similarly, second-level category indicator is output along with the identified issue description and displayed in a second-level category indicator display 120. If the user selects an alternative option from the set of prompted issue descriptions, the selection of the alternative option will be detected by the selection detector 112. The user will be prompted to enter an issue description into the user interface 102 and the natural language processing module 108 will be utilized to analyze the inputted issue description. The inputted issue description will be parsed into individual datum, and the individual datum will be tagged with indicators which designate each individual datum to a respective category. Based on the respective indicators, a first subset of the individual datum will be labeled with a first-level category indicator, and a second subset of individual datum will be labeled with a second-level category indicator. The first and second-level category indicators will then be output using first-level category indicator display 118 and second-level category indicator display 120, respectively.

Figure 2:
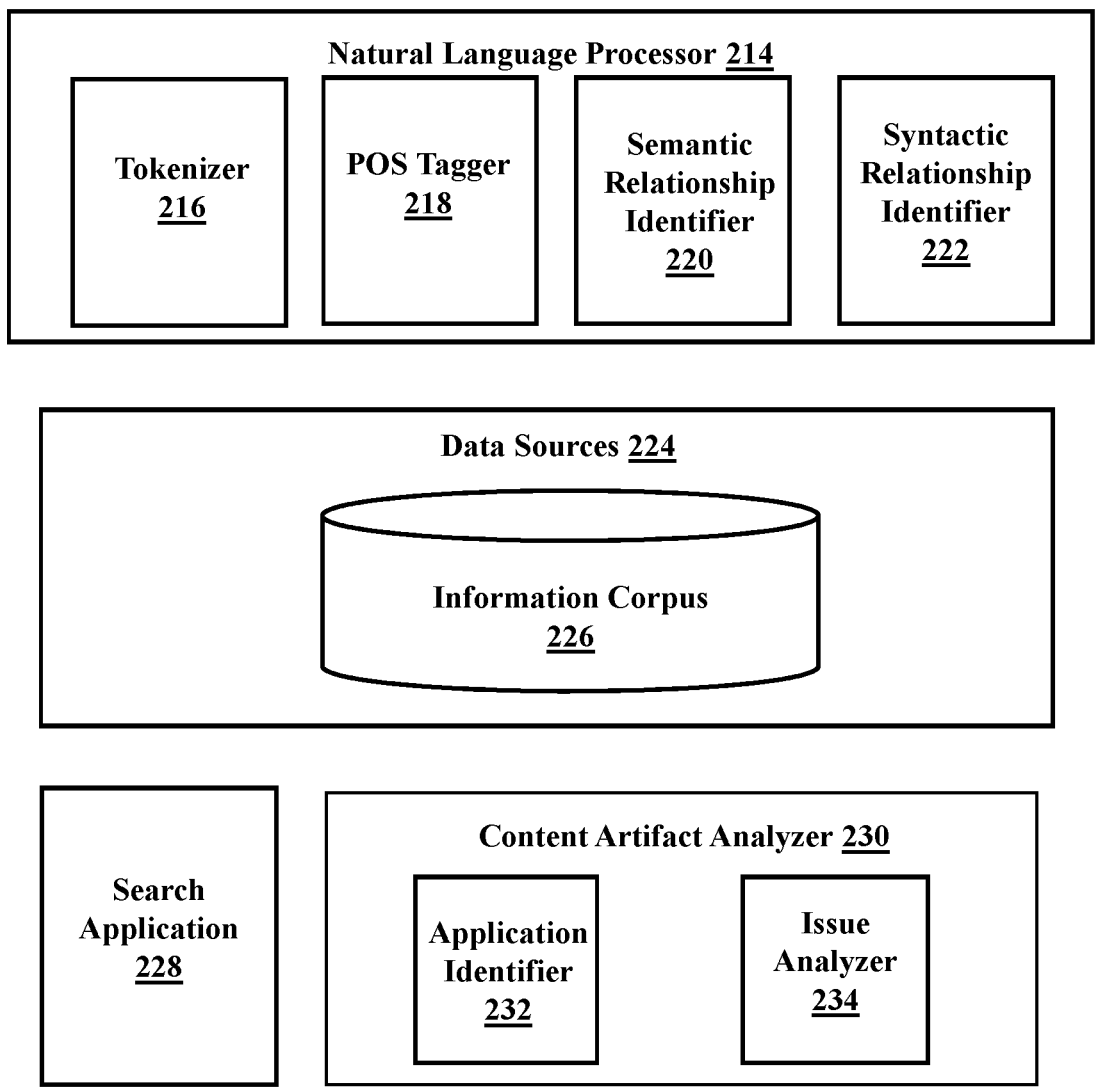
FIG. 2 is a block diagram of an exemplary natural language module configured to analyze issue data, in accordance with aspects of the present disclosure.

Turning now to FIG. 2, illustrated is a block diagram of an example natural language processing module 200 configured to analyze first issue data and/or inputted issue descriptions, in accordance with embodiments of the present disclosure.

In some embodiments, the natural language processing module 200 may include a natural language processor 214, data sources 224, a search application 228, and a content artifact analyzer 230. The natural language processor 214 may be configured to recognize and analyze any number of natural languages. In some embodiments, the natural language processor 214 may parse passages of the inputted data. Further, the natural language processor 214 may include various modules to perform analyses of the inputted data. These modules may include, but are not limited to, a tokenizer 216, a part-of-speech (POS) tagger 218, a semantic relationship identifier 220, and a syntactic relationship identifier 222.

In some embodiments, the tokenizer 216 may be a computer module that performs lexical analysis. The tokenizer 216 may convert a sequence of characters into a sequence of tokens. A token may be a string of characters included in an electronic document and categorized as a meaningful symbol. Further, in some embodiments, the tokenizer 216 may identify word boundaries in an electronic document and break any text passages within the document into their component text elements, such as words, multiword tokens, numbers, and punctuation marks. In some embodiments, the tokenizer 216 may receive a string of characters, identify the lexemes in the string, and categorize them into tokens.

Consistent with various embodiments, the POS tagger 218 may be a computer module that marks up a word in passages to correspond to a particular part of speech. The POS tagger 218 may read a passage or other text in natural language and assign a part of speech to each word or other token. The POS tagger 218 may determine the part of speech to which a word (or other text element) corresponds, based on the definition of the word and the context of the word. The context of a word may be based on its relationship with adjacent and related words in a phrase, sentence, or paragraph. In some embodiments, the context of a word may be dependent on one or more previously analyzed issue data. In embodiments, the output of the natural language processing module 200 may populate a text index, a triplestore, or a relational database to enhance the contextual interpretation of a word or term. Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, the POS tagger 218 may tag or otherwise annotate tokens of a passage with part of speech categories. In some embodiments, the POS tagger 218 may tag tokens or words of a passage to be parsed by the natural language processing module 200.

In some embodiments, the semantic relationship identifier 220 may be a computer module that may be configured to identify semantic relationships of recognized text elements (e.g., words, phrases) in documents. In some embodiments, the semantic relationship identifier 220 may determine functional dependencies between entities and other semantic relationships.

Consistent with various embodiments, the syntactic relationship identifier 222 may be a computer module that may be configured to identify syntactic relationships in a passage composed of tokens. The syntactic relationship identifier 222 may determine the grammatical structure of sentences such as, for example, which groups of words are associated as phrases and which word is the subject or object of a verb. The syntactic relationship identifier 222 may conform to formal grammar.

In some embodiments, the natural language processor 214 may be a computer module that may parse issue data and generate corresponding data structures for one or more portions of the issue data. For example, in response to receiving an unstructured textual report at the natural language processing module 200, the natural language processor 214 may output parsed text elements from the report as data structures. In some embodiments, a parsed text element may be represented in the form of a parse tree or other graph structure. To generate the parsed text element, the natural language processor 214 may trigger computer modules, including the tokenizer 216, POS tagger 218, semantic relationship identifier 220, and syntactic relationship identifier 222.

In some embodiments, the output of natural language processor 214 may be used by search application 228 to perform a search of a set of (e.g., one or more) corpora to retrieve information regarding content artifacts and/or issue descriptions. As used herein, a corpus may refer to one or more data sources. In some embodiments, the data sources 224 may include data warehouses, information corpora, data models, and document repositories. In some embodiments, the data sources 224 may include an information corpus 226. The information corpus 226 may enable data storage and retrieval. In some embodiments, the information corpus 226 may be a storage mechanism that houses a standardized, consistent, clean, and integrated list of issue descriptions/topics. The information corpus 226 may also store, for each issue description/topic, a list of associated outcomes by user. For example, the information corpus 226 may include a ranking of issue descriptions/topics for each encountered user, and/or a user profile for each encountered visitor. The data may be sourced from various operational systems. Data stored in the information corpus 226 may be structured in a way to specifically address reporting and analytic requirements. In some embodiments, the information corpus 226 may be a data repository, a relational database, triplestore, or text index.

In some embodiments, the content artifact analyzer 230 may be a computer module that identifies issue descriptions/topics. In some embodiments, the content artifact analyzer 230 may include an application identifier 232 and an issue analyzer 234. When an unstructured textual document is received by the natural language processing module 200, the content artifact analyzer 230 may be configured to analyze the document using natural language processing to identify one or more content topics. The content artifact analyzer 230 may first parse the conversation using the natural language processor 214 and related subcomponents 216-222. After parsing the conversation, the application identifier 232 may identify one or more applications present in the content artifact (e.g., user inputted data). This may be done, for example, by searching a software-oriented dictionary (e.g., information corpus 226) using the search application 228.

The issue analyzer 234 may determine the issue presented by a user for the content artifact, according to the content application identified by application identifier 232. This may be done by using the search application 228 to traverse the various data sources (e.g., the information corpus 226) for information regarding the terms and phrases used within the content artifact. The issue analyzer 234 may search, using natural language processing, documents from the various data sources for terms related to those detected in the content artifact.

Figure 3:
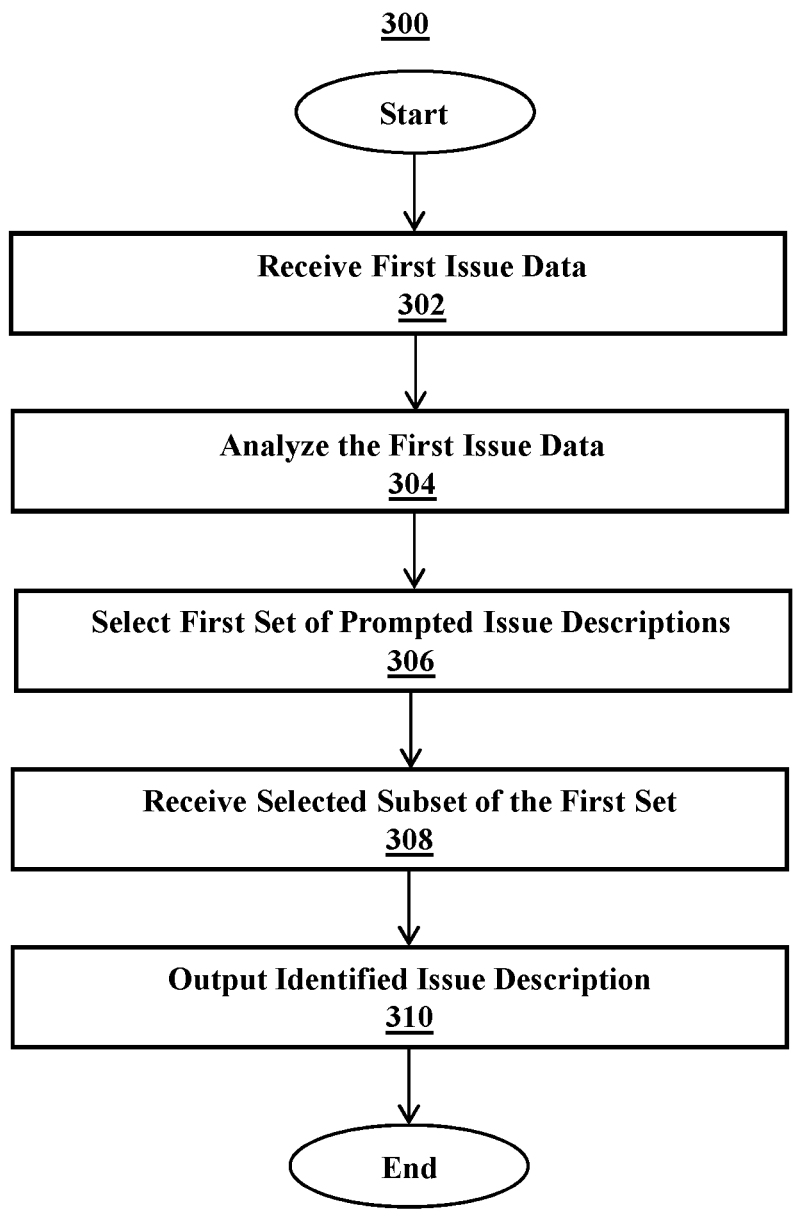
FIG. 3 is a flowchart of an exemplary method for issue description generation from data entered into an issue submission application, in accordance with aspects of the present disclosure.

Referring now to FIG. 3, illustrated is a flowchart of an exemplary method 300 for issue description generation from data entered into an issue submission application, in accordance with embodiments of the present disclosure. In some embodiments, a processor may perform the operations of the method 300. In some embodiments, method 300 begins at operation 302. At operation 302, a processor receives first issue data, where the first issue data is associated with input data entered by a user into a user interface on the issue submission application. In some embodiments, method 300 proceeds to operation 304, where the processor analyzes the first issue data.

In some embodiments, method 300 proceeds to operation 306 where the processor selects a first set of prompted issue descriptions, where the first set of prompted issue descriptions is selected based on analyzing the first issue data. In some embodiments, method 300 proceeds to operation 308 where the processor receives from the user a selected subset of the first set of prompted issue descriptions. In some embodiments, method 300 proceeds to operation 310 where the processor outputs an identified issue description which is generated based on the selected subset of the first set of prompted issue descriptions.

As discussed in more detail herein, it is contemplated that some or all of the operations of the method 300 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4A:
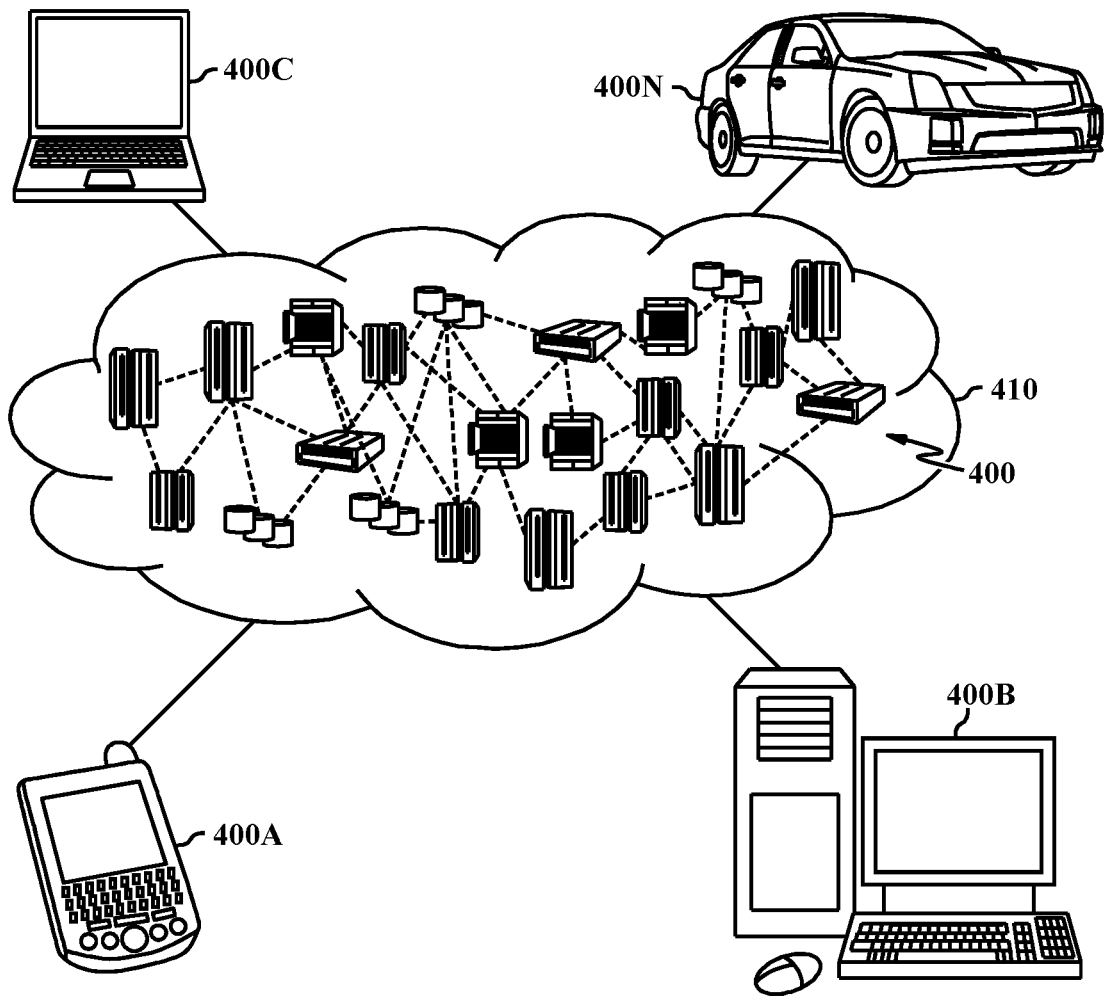
FIG. 4A illustrates a cloud computing environment, in accordance with aspects of the present disclosure.

FIG. 4A, illustrated is a cloud computing environment 410. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4A are intended to be illustrative only and that computing nodes 400 and cloud computing environment 410 can communicate with any type of computerized device over any type of network and/or network addressable connection (e.g., using a web browser).

Figure 4B:
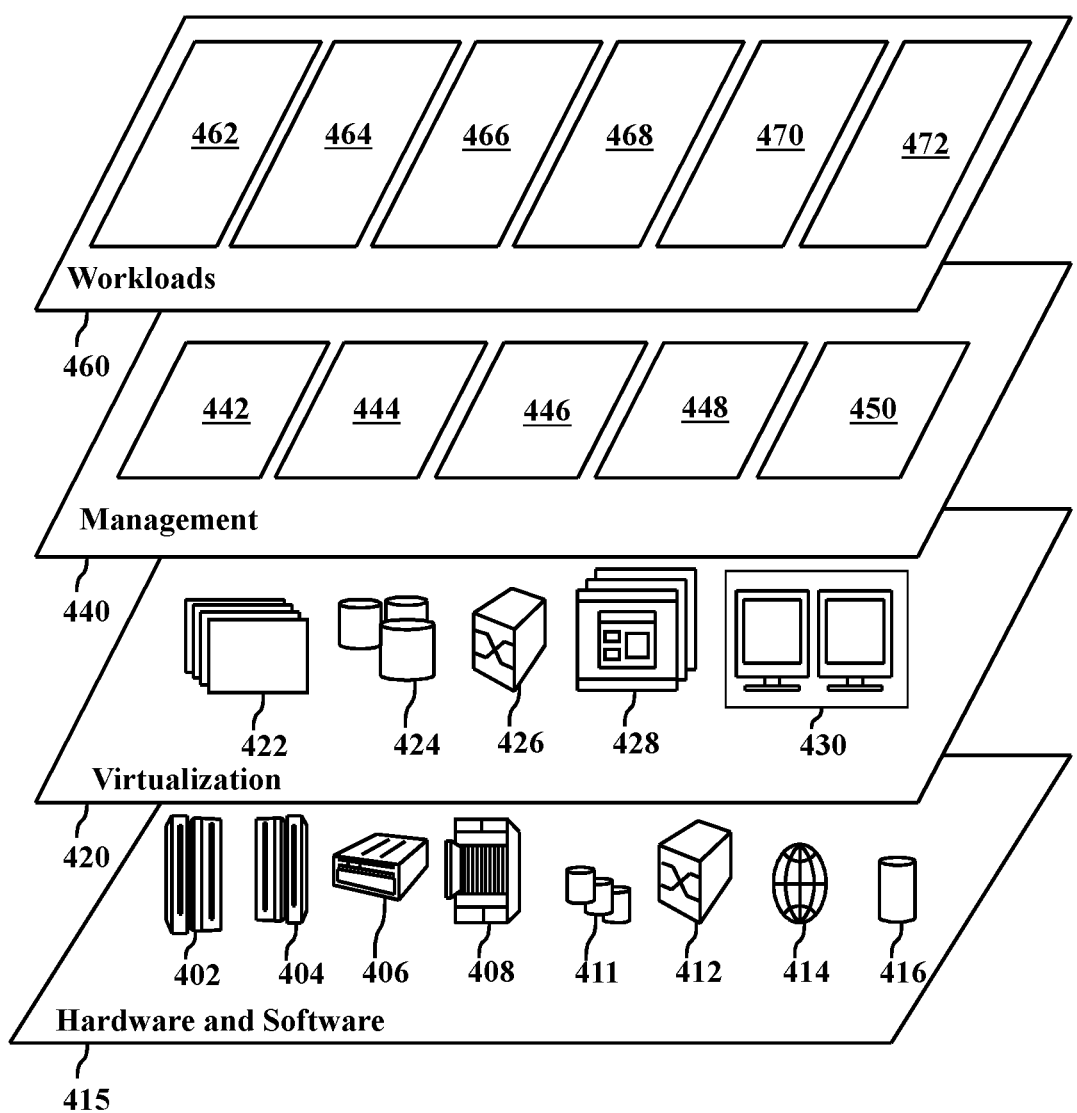
FIG. 4B illustrates abstraction model layers, in accordance with aspects of the present disclosure.

FIG. 4B, illustrated is a set of functional abstraction layers provided by cloud computing environment 410 (FIG. 4A). It should be understood in advance that the components, layers, and functions shown in FIG. 4B are intended to be illustrative only and embodiments of the disclosure are not limited thereto. As depicted below, the following layers and corresponding functions are provided.

Hardware and software layer 415 includes hardware and software components. Examples of hardware components include: mainframes 402; RISC (Reduced Instruction Set Computer) architecture based servers 404; servers 406; blade servers 408; storage devices 411; and networks and networking components 412. In some embodiments, software components include network application server software 414 and database software 416.

Virtualization layer 420 provides an abstraction layer from which the following examples of virtual entities may be provided: virtual servers 422; virtual storage 424; virtual networks 426, including virtual private networks; virtual applications and operating systems 428; and virtual clients 430.

In one example, management layer 440 may provide the functions described below. Resource provisioning 442 provides dynamic procurement of computing resources and other resources that are utilized to perform tasks within the cloud computing environment. Metering and Pricing 444 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 446 provides access to the cloud computing environment for consumers and system administrators. Service level management 448 provides cloud computing resource allocation and management such that required service levels are met. Service Level Agreement (SLA) planning and fulfillment 450 provide pre-arrangement for, and procurement of, cloud computing resources for which a future requirement is anticipated in accordance with an SLA.

Workloads layer 460 provides examples of functionality for which the cloud computing environment may be utilized. Examples of workloads and functions which may be provided from this layer include: mapping and navigation 462; software development and lifecycle management 464; virtual classroom education delivery 466; data analytics processing 468; transaction processing 470; and issue description recommending 472.

Figure 5:
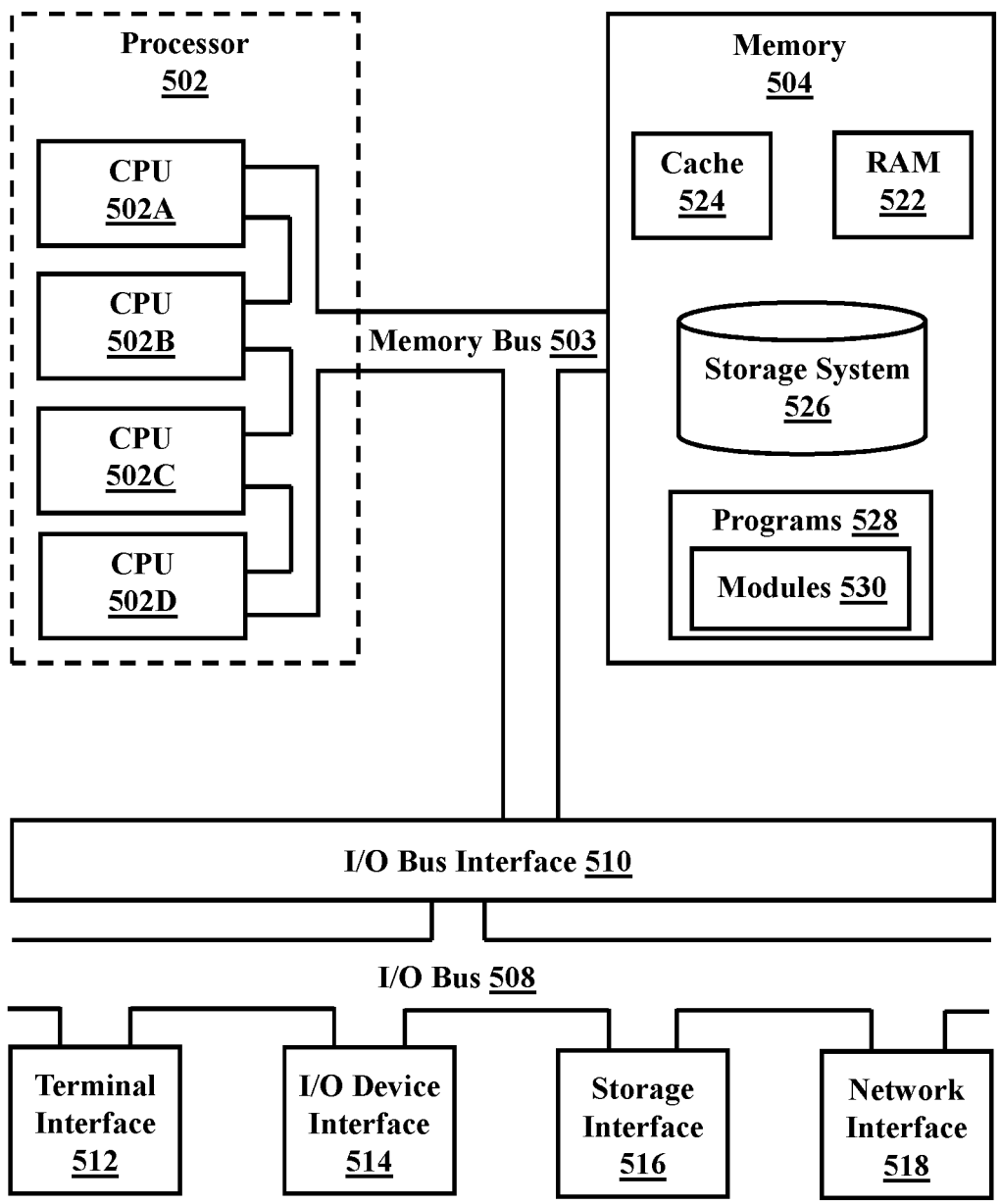
FIG. 5 illustrates a high-level block diagram of an example computer system that may be used in implementing one or more of the methods, tools, and modules, and any related functions, described herein, in accordance with aspects of the present disclosure.

FIG. 5, illustrated is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for issue description generation from data entered into an issue submission application, the method comprising:
   receiving, by a processor, first issue data, wherein the first issue data is associated with input data entered by a user into a user interface on the issue submission application;
   analyzing the first issue data;
   selecting a first set of prompted issue descriptions based on the analyzing of the first issue data, the selected first set of prompted issue descriptions comprising proposed descriptions of an issue for selection by the user;
   prompting the user to select a subset of the first set of prompted issue descriptions;
   receiving from the user a selected subset of the first set of prompted issue descriptions;
   tagging the selected subset of the first set of prompted issues descriptions with a confidence tag, wherein the confidence tag indicates that the selected subset of the first set of prompted issue descriptions has a high confidence of relating to the first issue data, on a basis of the user having selected the subset, and
   outputting an identified issue description, wherein the identified issue description is generated based on the selected subset of the first set of prompted issue descriptions.

2. The method of claim 1, wherein a machine learning engine is utilized to analyze the first issue data, and wherein the machine learning engine is trained utilizing the selected subset of the first set of prompted issue descriptions, the method further comprising:
   tagging the first issue data with a first issue descriptor tag; and
   storing the first issue data, the first issue descriptor tag, the selected subset of the first set of prompted issue descriptions, and the confidence tag in a repository.

3. The method of claim 2, further comprising:
   receiving second issue data;
   analyzing the second issue data using the machine learning engine;
   tagging the second issue data with a second issue descriptor tag, wherein the second issue descriptor tag is similar to the first issue descriptor tag; and
   selecting a second set of prompted issue descriptions, wherein the second set of prompted issue descriptions is selected to include at least one prompted issue description, of the selected subset of the first set of prompted issue descriptions, based on (i) the confidence tag indicating that the selected subset of the first set of prompted issue descriptions has a high confidence of relating to the first issue data, (ii) the tagging the first issue data with the first issue descriptor tag, and (iii) the similarity of the second issue descriptor tag to the first issue descriptor tag.

4. The method of claim 3, the method further comprising:
   labeling the identified issue description with a first-level category indicator associated with an application name; and
   labeling the identified issue description with a second-level category indicator associated with an issue type.

5. The method of claim 1, wherein analyzing the first issue data comprises:
   accessing a similarity model, wherein the similarity model provides the first set of prompted issue descriptions based on a similarity comparison of the first issue data and the first set of prompted issue descriptions.

6. The method of claim 5, wherein the first set of prompted issue descriptions includes an alternative option, and wherein the selected subset of the first set of prompted issue descriptions received from the user is the alternative option, the method further comprising:
prompting the user to input an issue description, wherein the inputted issue description is analyzed utilizing a natural language processing model.

7. The method of claim 6, further comprising:
parsing the inputted issue description into individual datum;
tagging the individual datum with respective indicators, wherein the respective indicators designate each individual datum to a respective category;
labeling a first subset of the individual datum with a first-level category indicator associated with an application name based on the respective indicators; and
labeling a second subset of individual datum with a second-level category indicator associated with an issue type based on the respective indicators.

8. The method of claim 1, wherein the first set of prompted issue descriptions comprises a plurality of issue descriptions presented to the user, wherein the user selects, as the selected subset, an issue description of the first set of prompted issue descriptions, wherein one or more issue descriptions of the first set of prompted issue descriptions go unselected by the user, and wherein the confidence tag further indicates that the selected issue description relates to the first issue data with greater confidence than does the one or more issue descriptions that go unselected by the user.

9. A system comprising:
a memory; and
a processor in communication with the memory, the processor being configured to perform operations comprising:
receiving first issue data, wherein the first issue data is associated with input data entered by a user into a user interface on the issue submission application;
analyzing the first issue data;
selecting a first set of prompted issue descriptions based on the analyzing of the first issue data, the selected first set of prompted issue descriptions comprising proposed descriptions of an issue for selection by the user;
prompting the user to select a subset of the first set of prompted issue descriptions;
receiving from the user a selected subset of the first set of prompted issue descriptions;
tagging the selected subset of the first set of prompted issues descriptions with a confidence tag, wherein the confidence tag indicates that the selected subset of the first set of prompted issue descriptions has a high confidence of relating to the first issue data, on a basis of the user having selected the subset; and
outputting an identified issue description, wherein the identified issue description is generated based on the selected subset of the first set of prompted issue descriptions.

10. The system of claim 9, wherein a machine learning engine is utilized to analyze the first issue data, and wherein the machine learning engine is trained utilizing the selected subset of the first set of prompted issue descriptions, and wherein the processor is further configured to perform operations comprising:
tagging the first issue data with a first issue descriptor tag; and
storing the first issue data, the first issue descriptor tag, the selected subset of the first set of prompted issue descriptions, and the confidence tag in a repository.

11. The system of claim 10, wherein the processor is further configured to perform operations comprising:
receiving second issue data;
analyzing the second issue data using the machine learning engine;
tagging the second issue data with a second issue descriptor tag, wherein the second issue descriptor tag is similar to the first issue descriptor tag; and
selecting a second set of prompted issue descriptions, wherein the second set of prompted issue descriptions is selected to include at least one prompted issue description, of the selected subset of the first set of prompted issue descriptions, based on (i) the confidence tag indicating that the selected subset of the first set of prompted issue descriptions has a high confidence of relating to the first issue data, (ii) the tagging the first issue data with the first issue descriptor tag, and (iii) the similarity of the second issue descriptor tag to the first issue descriptor tag.

12. The system of claim 11, wherein the processor is further configured to perform operations comprising:
labeling the identified issue description with a first-level category indicator associated with an application name; and
labeling the identified issue description with a second-level category indicator associated with an issue type.

13. The system of claim 9, wherein analyzing the first issue data comprises:
accessing a similarity model, wherein the similarity model provides the first set of prompted issue descriptions based on a similarity comparison of the first issue data and the first set of prompted issue descriptions.

14. The system of claim 13, wherein the first set of prompted issue descriptions includes an alternative option, and wherein the selected subset of the first set of prompted issue descriptions received from the user is the alternative option, and wherein the processor is further configured to perform operations comprising:
prompting the user to input an issue description, wherein the inputted issue description is analyzed utilizing a natural language processing model.

15. The system of claim 14, wherein the processor is further configured to perform operations comprising:
parsing the inputted issue description into individual datum;
tagging the individual datum with respective indicators, wherein the respective indicators designate each individual datum to a respective category;
labeling a first subset of the individual datum with a first-level category indicator associated with an application name based on the respective indicators; and
labeling a second subset of individual datum with a second-level category indicator associated with an issue type based on the respective indicators.

16. A computer program product comprising a computer readable storage medium having program instructions embodied therewith, the program instructions executable by a processor to cause the processor to perform operations, the operations comprising:
receiving first issue data, wherein the first issue data is associated with input data entered by a user into a user interface on the issue submission application;
analyzing the first issue data;
selecting a first set of prompted issue descriptions based on the analyzing of the first issue data, the selected first set of prompted issue descriptions comprising proposed descriptions of an issue for selection by the user;

prompting the user to select a subset of the first set of prompted issue descriptions;

receiving from the user a selected subset of the first set of prompted issue descriptions;

tagging the selected subset of the first set of prompted issues descriptions with a confidence tag, wherein the confidence tag indicates that the selected subset of the first set of prompted issue descriptions has a high confidence of relating to the first issue data, on a basis of the user having selected the subset; and outputting an identified issue description, wherein the identified issue description is generated based on the selected subset of the first set of prompted issue descriptions.

17. The computer program product of claim 16, wherein a machine learning engine is utilized to analyze the first issue data, wherein the machine learning engine is trained utilizing the selected subset of the first set of prompted issue descriptions, and wherein the operations further comprise:

tagging the first issue data with a first issue descriptor tag; and storing the first issue data, the first issue descriptor tag, the selected subset of the first set of prompted issue descriptions, and the confidence tag in a repository.

18. The computer program product of claim 17, wherein the operations further comprise:

receiving second issue data;

analyzing the second issue data using the machine learning engine;

tagging the second issue data with a second issue descriptor tag, wherein the second issue descriptor tag is similar to the first issue descriptor tag; and selecting a second set of prompted issue descriptions, wherein the second set of prompted issue descriptions is selected to include at least one prompted issue description, of the selected subset of the first set of prompted issue descriptions, based on (i) the confidence tag indicating that the selected subset of the first set of prompted issue descriptions has a high confidence of relating to the first issue data, (ii) the tagging the first issue data with the first issue descriptor tag, and (iii) the similarity of the second issue descriptor tag to the first issue descriptor tag.

19. The computer program product of claim 16, wherein analyzing the first issue data comprises:

accessing a similarity model, wherein the similarity model provides the first set of prompted issue descriptions based on a similarity comparison of the first issue data and the first set of prompted issue descriptions.

20. The computer program product of claim 19, wherein the first set of prompted issue descriptions includes an alternative option, and wherein the selected subset of the first set of prompted issue descriptions received from the user is the alternative option, the operations further comprising:

prompting the user to input an issue description, wherein the inputted issue description is analyzed utilizing a natural language processing model.

\* \* \* \* \*